United States Patent [19]

Ward

[11] 4,325,450
[45] Apr. 20, 1982

[54] AUTOMOTIVE OVERDRIVE WITH OFFSET INPUT AND OUTPUT SHAFTS

[75] Inventor: James E. Ward, Glendora, Calif.

[73] Assignee: Dean Sweeney, Jr., San Marino, Calif. ; a part interest

[21] Appl. No.: 127,464

[22] Filed: Mar. 5, 1980

[51] Int. Cl.³ .............................................. B60K 17/22
[52] U.S. Cl. ...................................... 180/247; 74/745; 74/477; 180/70 R; 180/70 MS; 180/335
[58] Field of Search ............. 180/233, 247, 335, 70 R, 180/70 MS; 74/740, 745, 477, 483 R, 483 K

[56] References Cited

U.S. PATENT DOCUMENTS

| | | | |
|---|---|---|---|
| 2,173,044 | 9/1939 | Ruggles et al. | 180/70 R |
| 2,475,803 | 7/1949 | Probst | 74/745 |
| 3,169,616 | 2/1965 | Hunsaker et al. | 74/477 |
| 3,554,047 | 1/1971 | Stott | 74/477 |
| 4,037,429 | 7/1977 | Britzius | 180/70 R |
| 4,083,419 | 4/1978 | Fogelberg | 180/70 R |
| 4,170,273 | 10/1979 | Kodama et al. | 180/233 |

Primary Examiner—Joseph F. Peters, Jr.
Assistant Examiner—Donn McGiehan
Attorney, Agent, or Firm—Christie, Parker & Hale

[57] ABSTRACT

An overdrive mechanism having offset input and output shafts permits a motor vehicle to be operated in an overdrive gear in a two wheel drive mode. A lockout prevents concurrent operation of the vehicle in overdrive and four wheel drive. The overdrive is arranged to reduce the magnitude of cyclic loading in single cardan universal joints transmitting engine torque through an angle.

14 Claims, 11 Drawing Figures

AUTOMOTIVE OVERDRIVE WITH OFFSET INPUT AND OUTPUT SHAFTS

BACKGROUND OF THE INVENTION

1. Field of the Invention

This invention pertains to motor vehicles. In a preferred embodiment, it pertains to motor vehicles having both a two wheel drive configuration and a four wheel drive configuration and which are retrofitted for operation in an overdrive gear in two wheel drive. A reciprocal lockout prevents concurrent operation of the vehicle in overdrive and four wheel drive. The overdrive is arranged to reduce the magnitude of cyclic loading in single cardan joints connected to a propeller shaft of the vehicle.

2. Review of the Prior Art

Off road driving is becoming increasingly popular as evidenced by the increase in sales of motor vehicles which are capable of either two wheel drive or four wheel drive modes of operation. In this time of diminishing resources, improvements in fuel economy of motor vehicles, which can be realized by an overdrive arrangement, are continually being sought to optimize performance.

The present invention is believed to have particular significance when used in a motor vehicle capable of operation in either four wheel drive or two wheel drive, but the invention can be used to advantage in more conventional motor vehicles which have only two wheel drive capability.

Motor vehicles transmit power from the engine to a drive axle. In many vehicles having both two and four wheel drive capability, such as a Jeep CJ-5 or an International Harvestor vehicle, in which this invention has particular significance, tubular propeller shafts transmit engine torque from a transfer case to the front and rear axle; the transfer case houses the gearing which enables selection between two wheel and four wheel vehicle operation modes. Single cardan universal joints connect each shaft to relevant transfer case and axle yokes. A substantially horizontal drive shaft driven by the engine is connected to the transfer case yoke, and an input shaft of a drive axle differential is connected to the axle yoke. The drive shaft and the input shaft are generally parallel but are not coaxial so that the drive shaft is high in the vehicle relative to the differential. This means that the propeller shaft is inclined relative to a substantially horizontal reference plane associated with the vehicle chassis and to the drive and input shafts with which it is coupled. It also means that the cardan joints operate at an angle.

Neither single cardan joint is a constant velocity universal joint. When torque is transmitted through single cardan universal joints operating at an angle, the rotating speeds of the joint driving and driven yokes will differ from each other during a single rotation of the driving yoke. In operation, the driving yoke rotates at a constant speed while the driven yoke speeds up and slows down twice every revolution.

This variation in driven yoke rotating speed is proportional to the operating angle of the universal joint. In effect, the greater the universal joint operating angle, the greater the speed fluctuation of the driven yoke. Speed fluctuation causes the cardan joints to experience substantial cyclic stresses during each rotation of the propeller shaft. Cyclic stresses tend to decrease the useful life of the cardan joints and the propeller shaft by causing progressive degradation, driveline vibration and eventual failure. When this occurs, it becomes necessary to repair or replace the cardan joints or the propeller shaft, which requires servicing the vehicle.

An overdrive arrangement permits a vehicle to operate at highway speeds with a lower engine rpm and greater fuel economy than would be possible in direct drive, i.e., without the overdrive capability. A higher gearing ratio is used in overdrive than in direct drive. In vehicles having four wheel drive capability, such as the Jeep CJ-5, the gearing for shifting between two wheel and four wheel drive is contained in the transfer case located at the rear of the transmission. To modify such a vehicle for overdrive, it is highly desirable to retrofit the transfer case so as to take advantage of the existing vehicle gearing and shifting mechanisms to the greatest extent possible. Since the front end of the transfer case is attached to the vehicle transmission, an ideal place to install the overdrive would be where the transfer case rear drive shaft connects to the rear inclined propeller shaft, i.e., at the back of the transfer case. While this location would take advantage of the existing gearing and shifting mechanisms of the vehicle, it effectively decreases the length of the rear propeller shaft because an overdrive mechanism is inserted between the transfer case and the rear differential. Any modification to provide an increased gearing ratio which effectively decreases the length of the rear propeller shaft, without adjusting its angularity relative to the rear drive axle, will aggravate a problem which is already troublesome in the Jeep CJ-5 vehicle.

A need exists for an overdrive mechanism connectible to a transfer case or transmission of a vehicle having an inclined driving propeller shaft and which does not produce an increase in that inclination.

Since the overdrive feature is useful only at highway speeds, where fuel economy rather than power or engine torque is the primary consideration, it is not necessary to adapt the overdrive mechanism for operation while the vehicle is engaged in the four wheel drive mode. By attaching the overdrive mechanism to the back of the transfer case, only the rear drive axle is affected. However, this presents another problem. If an overdrive gear were to be engaged while the vehicle is being operated in four wheel drive, the front axle would turn at a different rate of speed from the rear axle. This would create a host of manifest mechanical problems.

A need exists for an overdrive arrangement which prevents concurrent operation of the vehicle in the overdrive gear and in four wheel drive mode.

The use of this invention in a motor vehicle provides a simple and effective way to provide an overdrive arrangement which reduces cyclic loading stresses on single cardan joints operating at an angle and, in its preferred form, when used in a motor vehicle having both two wheel drive and four wheel drive modes, provides a reliable way to prevent simultaneous operation of the vehicle in four wheel drive and overdrive modes.

The present invention provides other advantages which are set forth in the following detailed description of preferred embodiments thereof.

SUMMARY OF THE INVENTION

This invention provides an overdrive mechanism affording improvements in the performance of motor vehicles. The structural and procedural aspects of the invention are simple, efficient, safe and reliable. This invention provides many advantages over conventional overdrive arrangements and, as noted, does not increase the inclination of the adjacent propeller shaft, while providing an overdrive arrangement connectible to the transfer case of a vehicle having four wheel drive and two wheel drive modes, and prevents simultaneous operation of the vehicle in four wheel drive and overdrive modes. Some of the advantages of the present invention, as more fully set forth below, include an increase in the fuel economy of the motor vehicle, due to providing the vehicle with an overdrive gear, and increased life of the cardan joints and propeller shaft of the vehicle.

Another advantage of this invention in its preferred form is that the overdrive conversion kit is adapted to use parts already present in the vehicle, such as the speedometer mechanism and the propeller shaft yoke, thus simplifying the retrofitting process. A further advantage is that the preferred overdrive is connectible to the back of the transfer case, so as to take advantage of as much of the existing vehicle shifting mechanism as possible, thereby making the conversion to overdrive simple and efficient.

Generally speaking, this invention provides an overdrive apparatus connectible in a power train of a motor vehicle between an engine in the vehicle and vehicle drivers such as drive wheels. The apparatus is operable alternately in standard and overdrive modes. An overdrive driving input shaft is drivable in response to operation of the engine. A shiftable gear mechanism is coupled between the input shaft and an overdrive driven output shaft. The gear mechanism is operative for interconnecting the shafts according to one or the other of two different selected gear ratios. One of the gear ratios corresponds to standard mode operation of the apparatus and defines an essentially 1:1 velocity ratio between the shafts. The other gear ratio corresponds to overdrive mode of operation of the apparatus and causes the output shaft to be driven substantially faster than the input shaft. The gear mechanism and the input and output shafts are disposed so that the output shaft is located below the input shaft. A selectively operable overdrive shifter is coupled to the gear mechanism operable for shifting the gear mechanism to define one or the other of the gear ratios.

In vehicles where a propeller shaft is mounted for rotation between a first cardan joint coupled to a substantially horizontal drive shaft driven by an engine in the vehicle and a second cardan joint connected to a substantially horizontal input shaft of a drive axle of the vehicle, for transmitting engine torque from the driven shaft to the drive axle, and in which the propeller shaft is inclined relative to a substantially horizontal reference plane associated with the chassis of the vehicle, the preferred overdrive mechanism is connectible to the drive shaft. A shiftable mechanism is arranged for selectively transmitting engine torque, in either of the two alternative effective gear ratios, from the drive shaft to the first cardan joint. The overdrive is arranged to cause the first cardan joint to be so located vertically relative to the second cardan joint to produce no increase in the inclination of the propeller shaft relative to the horizontal reference plane.

BRIEF DESCRIPTION OF THE DRAWINGS

The above-mentioned and other features of this invention are more fully set forth in the following detailed description of presently preferred embodiments, which description is presented with reference to the accompanying drawings, wherein.

DESCRIPTION OF THE ILLUSTRATED EMBODIMENTS

Figure 1:
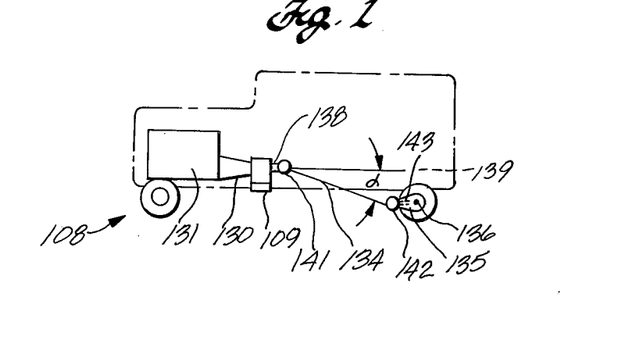
FIG. 1 is a side schematic of a motor vehicle prior to retrofit with the overdrive and illustrating the inclination of the driving rear propeller shaft.

FIG. 1 illustrates schematically a vehicle to be modified according to this invention before actual retrofit occurs. A rear propeller shaft 134 is mounted between a transfer case 109 and a rear differential 135. The transfer case is connected to a transmission 130 which connects to an engine 131 of the vehicle.

Figure 2:
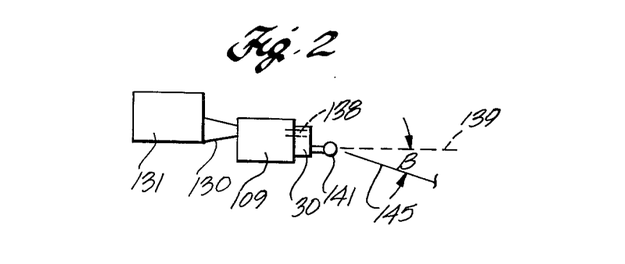
FIG. 2 is a partial side schematic of the motor vehicle retrofit with an overdrive arrangement according to this invention and illustrating a reduced inclination of the rear propeller shaft.

The transfer case contains the gearing necessary to transmit engine torque either to both the front and rear axles of the vehicle, in four wheel drive mode, or to only the rear axle of the vehicle, in two wheel drive mode. The preferred overdrive affects only the rear axle drive so only the rear propeller shaft is shown in FIG. 1 and FIG. 2. The propeller shaft transmits engine torque from the transfer case to the rear differential. The rear differential transmits engine torque from the propeller shaft to a rear axle 136. Propeller shaft 134 is mounted between single cardan joints 141 and 142. Cardan joint 141 is connected by a transfer case yoke to a transfer case output shaft 138 driven by an engine in the vehicle. Cardan joint 142 is connected by an axle slip yoke to an input shaft 143 of the rear differential. A substantially horizontal reference plane 139 associated with a chassis of the vehicle is also shown.

Shaft 138 is substantially horizontal with respect to the reference plane, as is rear differential input shaft 143. Shaft 138 is located high in the vehicle relative to shaft 143 so that propeller shaft 134 is inclined relative to the plane 139. Engine torque is transmitted through the single cardan universal joints which operate at an angle. The inclination of propeller shaft 134 is represented by angle χ shown in FIG. 1 and is exaggerated for purposes of illustration.

FIG. 2 illustrates aspects of the vehicle shown in FIG. 1 as retrofitted for overdrive according to this invention. An overdrive 30 is attached to the rear of transfer case 109 and is coupled to a propeller shaft 145 which in turn is connected to the rear axle differential 135.

The overdrive is connected to shaft 138. The overdrive output also connects to propeller shaft 145 via first cardan joint 141. Since an overdrive gear box is added between the transfer case and the rear differential, it is necessary that propeller shaft 145 be shorter than shaft 134 as shown in FIG. 1. New propeller shaft 145, replacing propeller shaft 134, is installed between the first cardan joint and second cardan joint 142 connected by a slip yoke to the rear differential. Substantially horizontal reference plane 139 is also shown in FIG. 2 with angle β which new propeller shaft 145 makes with it. In the preferred overdrive, in which a Jeep CJ-5 is retrofitted, there is about a four inch shortening of the original length of the propeller shaft which has a length of about twenty inches.

As shown in FIG. 2, the overdrive 30 transmits engine torque from drive shaft 138 to the first cardan joint 141. As will be discussed, overdrive 30 is connectible to shaft 138 by an input shaft 32 and to the first cardan joint 141 by an output shaft 33 with a yoke 93, shown in FIGS. 3 and 4. The front drive axle is not affected, nor is the front propeller shaft.

The overdrive includes a shiftable mechanism for selectively transmitting engine torque in either of two alternate effective gear ratios (i.e., the direct drive gear ratio and the overdrive gear ratio) from shaft 138 to the first cardan joint. The overdrive is arranged to cause no increase in the inclination of the rear propeller shaft. The shiftable overdrive mechanism of FIG. 2 is preferably arranged to cause first cardan joint 141 to be so located vertically relative to cardan joint 142 to produce a reduction in the inclination of the propeller shaft 145 relative to horizontal reference plane 139. Although new propeller shaft 145 is shorter than original propeller shaft 134, the location of the overdrive output shaft 33 relative to shaft 138 is chosen to cause cardan joint 141 to be lower in the retrofitted vehicle, as shown in FIG. 2, than it is in its original position as shown in FIG. 1. The inclination of the propeller shaft 145, represented by angle β, is not greater than and is preferably less than the inclination of propeller shaft 134, represented by angle χ.

Cardan joints 141 and 142 are conventional single cardan universal joints and are not constant velocity universal joints. Due to the inclination of propeller shaft 134 relative to shaft 138 and shaft 143, torque is transmitted through the single cardan universal joints operating at an angle. As a result, the cardan joints experience substantial cyclic loading stresses during each rotation of the propeller shaft, which itself experiences significant loading stresses. The overdrive retrofit does not increase the operating angles of the cardan joints and preferably reduces them. The magnitude of cyclic loading in the joints during each rotation of the propeller shaft is substantially reduced as a result.

The preceding discussion makes particular reference to retrofitting a Jeep CJ-5 vehicle for overdrive operation in two wheel drive. It should be understood, however, that the feature of reduced cyclic loading of cardan joints in an overdrive retrofit can be practiced to advantage in any vehicle where engine torque is transmitted through single cardan universal joints operating at an angle.

Figure 3:
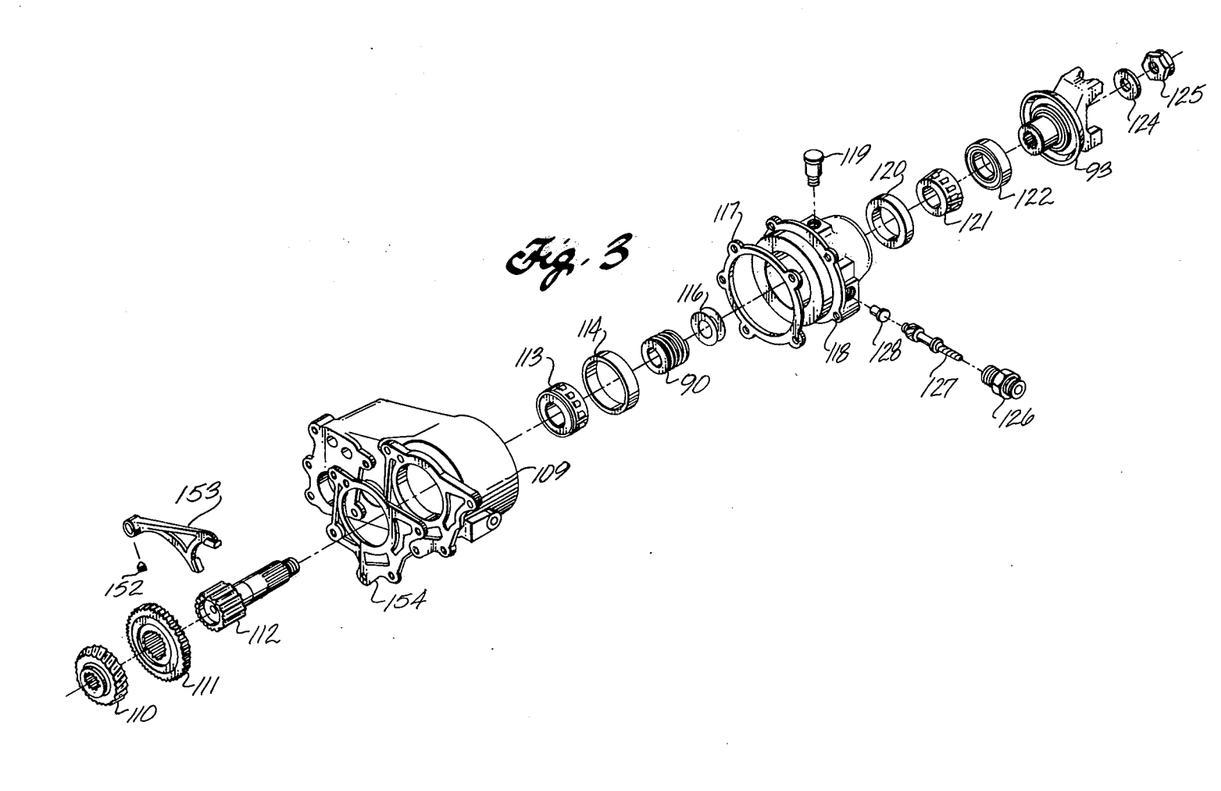
FIG. 3 is an exploded perspective view of a portion of a transfer mechanism of a vehicle having four wheel and two wheel drive capability, which vehicle is to be retrofitted for operation in an overdrive gear.

FIG. 3 illustrates modification of the transfer mechanism of a Jeep CJ-5 vehicle according to this invention.

The mainshaft gear 110 and the rear output shaft sliding gear 111 are retained and remain in the transfer case 109, as are a rear output shaft shift fork 153, set-screw 153, and transfer case front gasket 154. Rear output shaft 112 is discarded and is replaced by a new overdrive driving input shaft 32 described more fully in connection with FIG. 4. Rear output shaft front bearing 113 and bearing cup 114 are discarded along with rear output shaft bearing shims 116. The speedometer drive worm 90 is retained and is to be received on a new overdrive output shaft 33, discussed in connection with FIG. 4. The preferred overdrive is adapted to receive the original speedometer drive gear used in the transfer case.

Rear bearing cap gasket 117 is discarded and is to be replaced by a new overdrive adaptor gasket 100. Rear bearing cap 118 is discarded and is to be replaced by new overdrive gear case assembly 30, shown in FIGS. 5 and 7. Breather 119 is retained and is to be received on a shift fork housing 48, shown in FIG. 7. The rear output shaft rear bearing cup 120, the rear output shaft bearing 121, and the rear bearing cap oil seal 122 are discarded. Rear yoke 93 is retained along with rear yoke washer 124 and rear yoke nut 125. The rear axle yoke assembly is to be received on the rear end of the new overdrive output shaft 33 which will be discussed in connection with FIG. 4.

Speedometer sleeve 126, speedometer gear 127, and speedometer bushing 128 are retained and are to be received in the new overdrive gear case 31 in a speedometer cavity 89. All other parts of the original transfer case assembly are retained in their original configurations.

Figure 4:
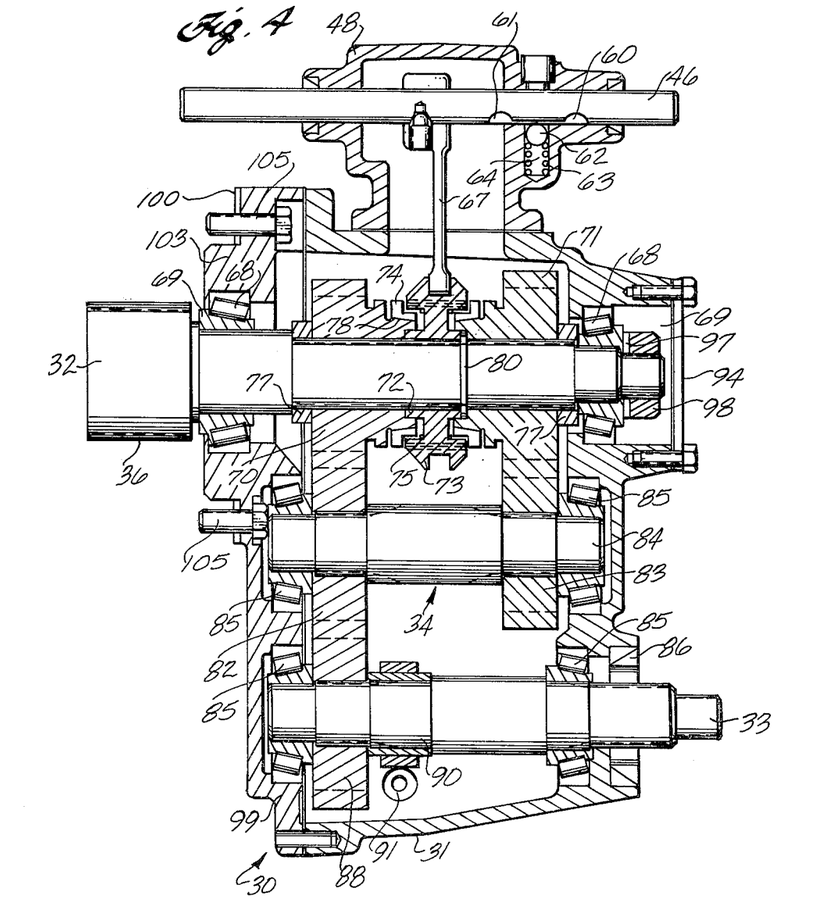
FIG. 4 is a cross-sectioned elevation view of the overdrive mechanism according to this invention.

The overdrive mechanism 30 is secured to transfer case 109 by a series of bolts 105, two of which are shown in FIG. 4. Bolts 105 pass through an adaptor plate 99 and are received in the transfer case in tapped holes that originally received the bolts fastening the discarded rear bearing cap 118.

In the original transfer case assembly, speedometer gear 127 was meshed with rear output shaft 112 to measure its angular velocity. By connecting the speedometer gear to the new overdrive output shaft, accurate readings will be obtained in both the direct drive and overdrive modes. The preferred retrofit uses as much of the existing vehicle transfer case assembly as is possible and reuses parts, such as the speedometer mechanism, the breather cap, and the rear axle yoke assembly.

An overdrive mechanism 30 for a motor vehicle is shown in cross section in FIG. 4 and includes a gear case 31 receiving an overdrive driving input shaft 32 mounted in the gear case. The gear case is adapted to engage a transfer case (shown in FIG. 3) or a transmission of a motor vehicle for enabling the motor vehicle to be operated in an overdrive configuration. When so engaged, the overdrive driving input shaft is drivable in response to an engine in the vehicle.

An overdrive-driven output shaft 33, mounted in the gear case, is also a component of overdrive 30. A shiftable gear arrangement 34 located in the gear case is coupled between the input and output shafts. The shiftable gear arrangement is operative for connecting shafts 32 and 33 according to one or the other of two different selected gear ratios. One of the gear ratios (direct drive) defines an essentially 1:1 velocity ratio between the shafts. The other gear ratio (overdrive) causes the output shaft to be driven substantially faster than the input shaft. In a preferred embodiment, the gear arrangement and the input and output shafts are disposed in the gear case so that the output shaft is located below the input shaft.

Figure 5:
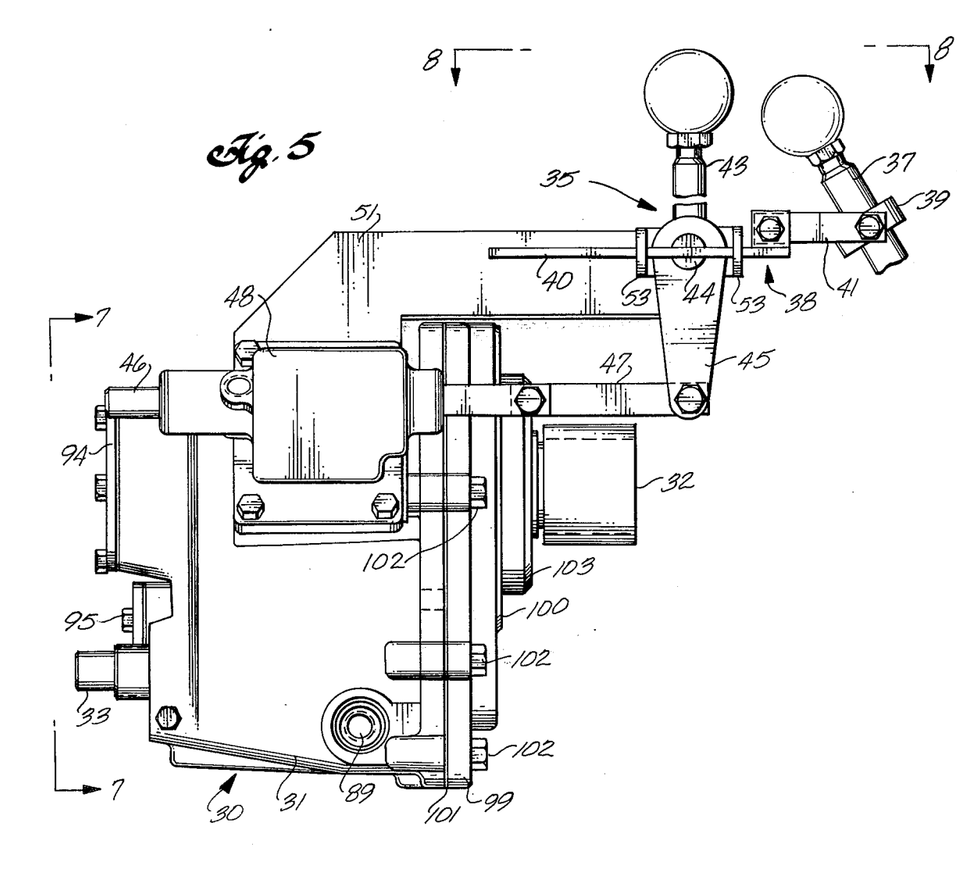
FIG. 5 is a right side elevation view of the overdrive mechanism when disposed in a direct drive mode.

The overdrive 30 also includes an overdrive shifter 35, for selecting one or the other of the gear ratios, as shown in FIG. 5. Shifter 35 includes a shift rod 46 received in a shift fork housing 48 that is mounted on the gear case 31. The shift fork housing defines a cavity 64 for receiving spring 63 which resiliently urges ball 62 against shift rod 46. Overdrive detente 61 and direct drive detente 60 defined in the shift rod are adapted to releasably receive the ball when positioned over cavity 64. A shift fork 67 is mounted to the shift rod to reciprocate in the gear case as the shift rod reciprocates in response to operation of the overdrive shifter, from a direct drive position, where ball 62 engages drive detente 60, to an overdrive shift position, where ball 62 engages overdrive detente 61. The spring provides a 'locking' action of the ball in a selected detente so that the shift fork will not accidentally slip out of position once the overdrive actuator has selected a desired gear ratio.

The mounting of the shift fork housing and of a plate 51, shown better in FIG. 5, underneath it to the gear case is such as to permit communication of the shift fork with the inside of the gear case. Thus, gear case 31, plate 51, and the shift fork housing 48 each have a rectangular aperture to allow the shift fork to reciprocate between the direct drive position and the overdrive shift position.

Overdrive driving input shaft 32 is mounted for rotation in the gear case under the shift fork and the shift fork housing. The forward end of input shaft 32 is splined at 36 and is adapted to engage the motor vehicle transfer case shown in FIG. 3. Spline 36 reproduces the front portion of discarded rear output shaft 112 to enable the input shaft to be received usefully in the transfer case. The mainshaft gear 110 and the sliding gear 111 are received on input shaft spline 36 inside the transfer case.

The input shaft 32 is splined along its middle portion and receives direct drive gear 70, clutch hub 72, clutch sleeve 73, and overdrive gear 71 in a conventional synchromesh clutch arrangement. Synchromesh clutch arrangements are well known to those skilled in the art and have been described in an extensive body of technical publications and patents. Accordingly, this description will be directed primarily to the operation of the synchromesh clutch in the overdrive arrangement. Direct drive gear 70 and overdrive gear 71 are not splined on the input shaft and, when not engaged with the clutch, are free to rotate at a rate different from that of the input shaft. In contrast, clutch hub 72 is splined on the input shaft and is constrained to rotate with the input shaft. The clutch sleeve is splined on the hub but may reciprocate axially over it. The clutch sleeve is adapted to engage the shift fork, as by a groove circumscribing the sleeve, to move over the hub along the input shaft in response to movement of the shift fork. A retaining ring 80 holds the clutch hub in place on the input shaft.

The following discussion is directed to the operation of the synchromesh clutch with respect to the direct drive gear. A set of conventional shifting plates 75 are held in place between the clutch hub and sleeve by a spring. A standard blocking ring 74 is located on the input shaft between the clutch assembly and the direct drive gear and is adapted to engage the shifting plates and a frustrum-shaped hub surface 78 on the direct drive gear. As the shift fork is shifted to a direct drive position, from an overdrive position, in response to movement of shift rod 46, from a position where detent 61 engages ball 62 over cavity 64, toward a position where detent 60 engages the ball, the clutch sleeve moves toward the direct drive gear, causing the shifting plates to engage the blocking ring which rotates in direct response. The inside edge of the blocking ring is smooth and complements surface 78. Frictional contact between the ring and the surface 78 causes the direct drive gear, which is not splined on the input shaft, to rotate in response to the friction. Increasing friction in response to further movement of the clutch sleeve toward the direct drive gear causes the direct drive gear to assume an angular velocity equal to that of the clutch sleeve, which permits engagement of gear teeth on the clutch sleeve and the direct drive gear, and engagement of the direct drive gear. Engagement continues until the shift fork is moved out of the direct drive position. Movement toward the overdrive position causes the clutch sleeve to move away from the direct drive gear and to disengage the gear. On the other side of the clutch, facing the overdrive gear, the synchromesh arrangement is identical.

The direct drive gear and the overdrive gear preferably have helical teeth for engaging, respectively, idler gear 82 and overdrive driven gear 83 splined on the idler shaft 84. Thrust washers 77 are mounted on the input shaft outside the former gears to keep them in proper position.

The idler shaft is received in bearings 85 for rotation in the gear case. Splines near each end of idler shaft 84 terminate on the shaft portion inside the idler and overdrive driven gears. This idler shaft has a larger diameter than the pitch diameter of the splines to keep these gears in position on the idler shaft engaged with, respectively, the direct drive and overdrive gears of the input shaft.

Output shaft 33 is mounted in the gear case by bearings 85 and is preferably located below the input shaft. Output gear 88 is received on a splined portion of the output shaft and is constrained to rotate with it.

The transmission of power in the direct drive gear mode occurs when shift rod 46 occupies the direct drive position in response to operation of the over-drive actuator so that direct drive detente 60 is positioned over cavity 64 and receives ball 62. The locking effect of spring 63 resists unintended movement of the shift rod. Shift fork 67 has caused the clutch sleeve to engage and drive direct drive gear 70, which means that this gear is rotating at the same angular velocity as is the input shaft. The direct drive gear drives the idler gear and causes the idler shaft to rotate in direct response. The idler gear also drives the output gear which by virtue of the splining of the output gear on the output shaft 33, drives the output shaft. The pitch diameters of the output gear 88, the idler gear 82, and of the direct drive gear 70 are chosen so that in the direct drive gear mode, there is an essentially 1:1 velocity ratio between the overdrive driving input shaft 32 and the overdrive driven shaft 33. In the presently preferred overdrive, there is an essentially 1:1 ratio between the effective pitch diameters of output gear 88 and idler gear 82 and also between idler gear 82 and direct drive gear 70. As power is transmitted from the input shaft to the clutch hub, clutch sleeve, direct drive gear, idler gear, output gear and output shaft, there is an essentially 1:1 velocity ratio between the overdrive driving input shaft 32 and the overdrive driven output shaft 33.

The transmission of power in the overdrive gear mode occurs when selection of the overdrive gear ratio causes shift rod 46 to position overdrive detente 61 over cavity 64 to engage ball 62. Shift fork 67 is positioned to cause clutch sleeve 73 to engage overdrive gear 71. The overdrive gear is rotating at the angular velocity of the clutch sleeve, the clutch hub and the input shaft 32. In contrast, direct drive gear 70 does not engage the clutch in the overdrive mode and is free to rotate at a different velocity from that of the input shaft. Overdrive gear 71 engages and drives overdrive driven gear 83, which by virture of the splining of the overdrive driven gear and idler gear 82 on idler shaft 84, drives the idler shaft and the idler gear. Output gear 88 is driven by the idler gear and drives the output shaft 33.

As discussed, the effective pitch diameters of the idler gear 82 and the output gear 88 are preferably chosen to cause an essentially 1:1 velocity ratio between the idler shaft 84 and the output shaft 33 although other ratios can be used. The effective pitch diameters of overdrive gear 71 and overdrive driven gear 83 are chosen to cause the output shaft to be driven substantially faster than the input shaft in the overdrive gear mode. The effective pitch diameters are chosen so that the output shaft is driven substantially faster than and preferably around about $1\frac{1}{4}$ times as fast as is the input shaft. This means that the overdrive gear 71 has a greater effective pitch diameter than does overdrive driven gear 83. Moreover, in the overdrive gear mode, the idler shaft is driven by the overdrive driven gear at a higher velocity than the input shaft 32.

On the other hand, when the direct drive mode has been selected, the direct drive gear 70 is engaged with the clutch and drives the idler gear. This means that in the direct drive mode the idler shaft is driven by the idler gear at the same velocity as the input shaft.

As shown in FIG. 4, the output shaft 33 receives a speedometer worm 90 above a speedometer bearing 91 received in the gear case. The speedometer worm preferably is the part 127 used in the retrofitted vehicle transfer case or transmission and is taken out of its original position mounted on the rear output shaft 112 and is placed on the overdrive output shaft 33. By connecting the speedometer gear to the new overdrive output shaft the speedometer will give an accurate reading both in the direct drive and the overdrive modes. The rear portion of output shaft 33 extends out from the gear case and is splined to receive a yoke 93 in seal 86 mounted in the gear case. Yoke 93 in its original connection was received in the vehicle transfer case or transmission as shown in FIG. 3. The rear portion of the output shaft reproduces the rear portion of discarded shaft 112 in order to properly receive the rear yoke assembly.

Figure 6:
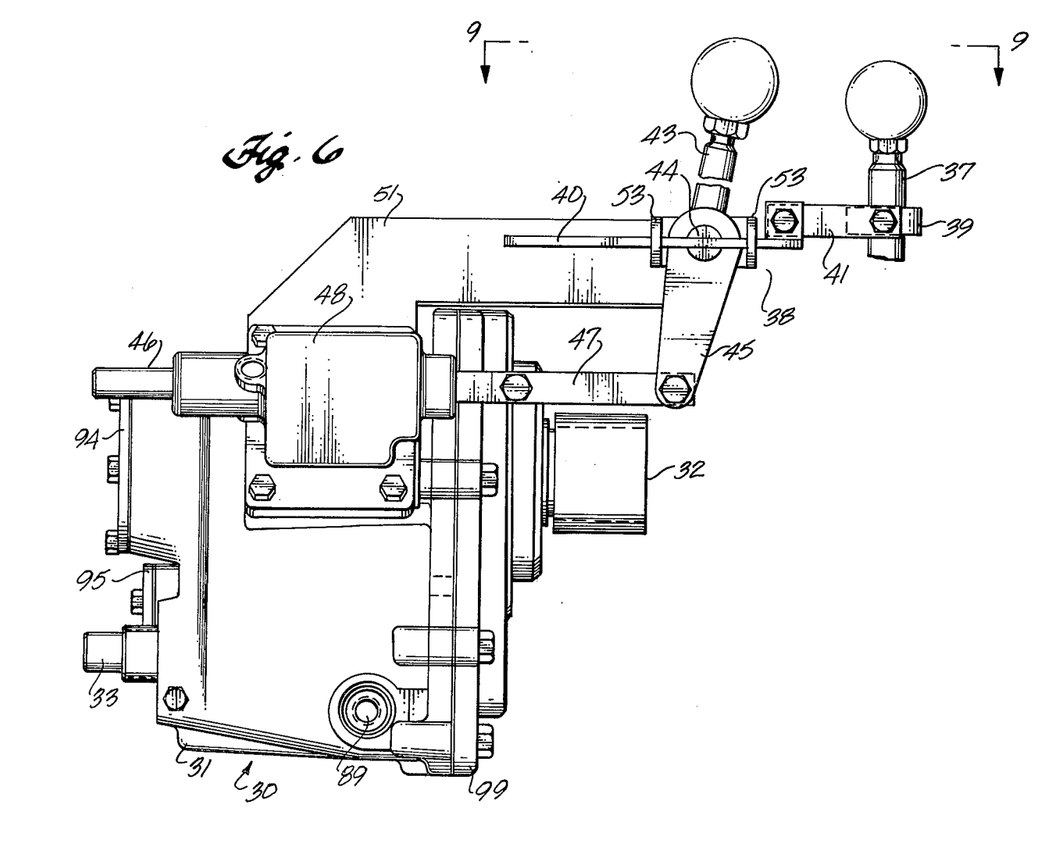
FIG. 6 is a right side elevation view of the overdrive mechanism when disposed in an overdrive mode.
Figure 7:
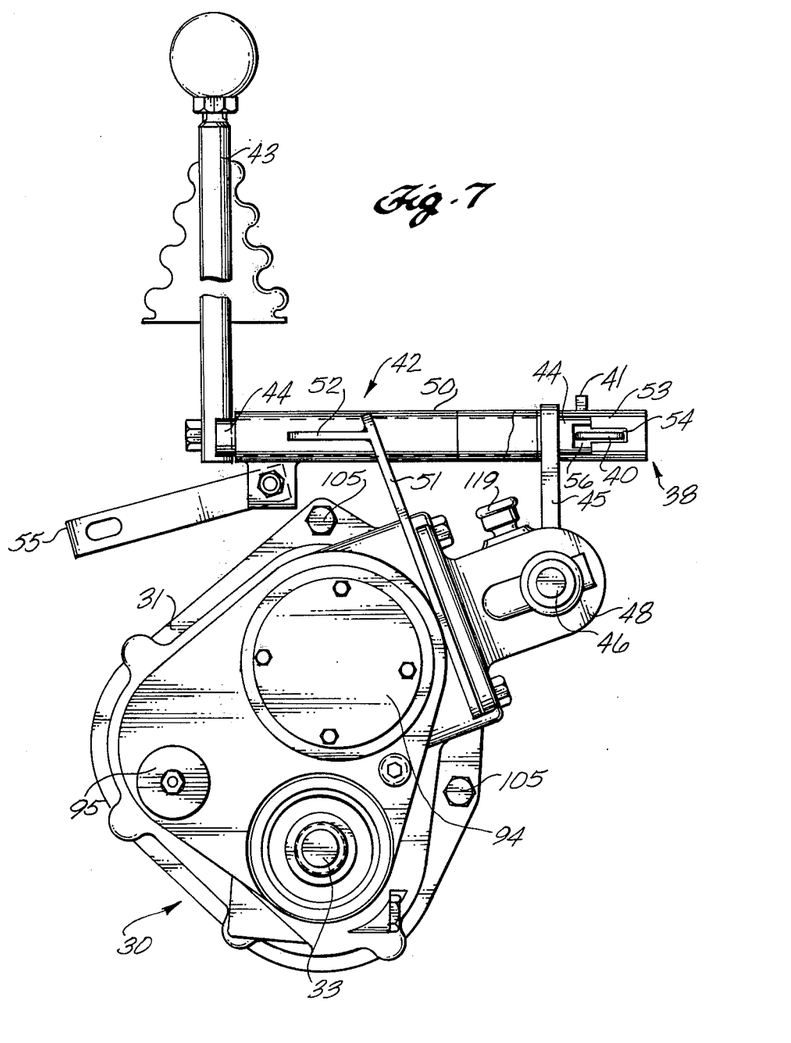
FIG. 7 is a rear elevation view of the overdrive taken along line 7—7 in FIG. 5.

The input shaft is received in bearing cone 68 and bearing cup 69. A washer 97 and a lock nut 98 also receive the input shaft. A cover plate 94 is mounted to the gear case over the bearing cup 69 to protect the input shaft mounting assembly and to provide access if servicing or repairs are needed. Similarly, vent cover 95, shown in FIGS. 5-7, provides access and protection to idler shaft 84.

As shown in FIG. 4, and in FIG. 5, an adaptor plate 99 is mounted by screws 102 and gear housing gasket 101 to the gear housing. As best seen in FIG. 5, the adaptor plate includes an outwardly facing boss 103.

The boss has a circular cross-section and is adapted to be received in the transfer case 109 of the vehicle to be retrofitted for overdrive. In vehicles having only two wheel drive capability there is no transfer case. In these vehicles the boss is preferably adapted to be received in a rear portion of the transmission housing.

The boss is designed to fit where the rear yoke 93 had originally been fitted, i.e., to a large upper hole on the transfer case rear plate. This hole originally received a rear bearing cap 118 that housed the forward part of the universal joint assembly for the rear propeller shaft of the vehicle, as shown in the FIG. 3 exploded view. The adaptor plate boss reproduces the forward face of the discarded rear bearing cap to enable the overdrive gear housing assembly to mate with the transfer case by bolts 105. Adaptor gasket 100 provides a seal between the transfer case and the adaptor plate and reproduces the circular configuration of discarded rear bearing cap gasket 117.

This invention has particular significance for use in a motor vehicle adapted for operation in either a two-wheel drive configuration or a four-wheel drive configuration. In such a preferred embodiment, illustrated in right side elevation in FIGS. 5 and 6, the overdrive driven input shaft 32 is connected to a vehicle selector mechanism (i.e., transfer case 109) arranged for selecting between two-wheel drive mode and the four-wheel drive mode of operation of the vehicle. The vehicle selector mechanism has an actuator including transfer case shift lever 37. Lever 37 is adapted to be operated by a driver of the vehicle. It is possible to modify the vehicle selector mechanism so that shift lever 37 can accommodate both overdrive and direct drive shift positions, and this invention may be so practiced. Thus it is possible to use a single shift lever for both the overdrive shifter and the vehicle selector mechanism. However, in the preferred form of this invention, shown in FIG. 5, the overdrive shifter and the vehicle selector mechanism each have a separate actuator. In such an embodiment, overdrive 30 includes a lockout 38 which interrelates the operation of the actuators. Lockout 38 includes collar 39 received on the transfer case shift lever. A lockout bar 40 is coupled to the collar by lockout linkage 41 and may selectively engage the overdrive shifter 35. The lockout bar is adapted to reciprocate with respect to the overdrive shifter from a four-wheel drive position of the transfer case shift lever, as shown in FIG. 5, to a two-wheel drive position of the transfer case shift lever, as shown in FIG. 6.

FIG. 7 is a rear elevation view of the overdrive taken along line 7—7 of FIG. 5. FIG. 7 illustrates the actuator 42 for the overdrive shifter coupled to the gear case. An overdrive shift lever 43 is mounted at one end of a rod 44 to cause the rod to rotate as the shift lever is moved from side to side. Shift arm 45 is mounted proximate the other end of the rod. The mounting of the shift arm and of the overdrive shift lever to the rod is such as to cause the entire assembly to move as a unit. Thus, as best seen in FIG. 5 and FIG. 6, a movement of overdrive shift lever 43 from a direct-drive shift position, as shown in FIG. 5, to an overdrive shift position, as shown in FIG. 6, causes shift arm 45 to rotate in direct response. The shift arm is coupled to shift rod 46 by a shift lever link 47. The shift rod is received in shift fork housing 48 carried by the gear case. The shift rod reciprocates relative to the housing in response to rotation of the shift arm caused by operation of the overdrive shift lever, as shown in FIG. 5 and FIG. 6.

Actuator 42 for the overdrive shifter passes through a tube 50 which shields rod 44. As shown in FIG. 7, and also in FIGS. 5 and 6, tube 50 is mounted to the gear case by plate 51. Plate 51 is secured to the tube by gusset 52 and is received by the gear case under the shift fork housing. The mounting of the plate and the tube provides support and alignment for actuator 42. Additional support is provided by brace 55 for mounting the front end of the tube to a suitable location on the chassis of the vehicle.

Figure 8:
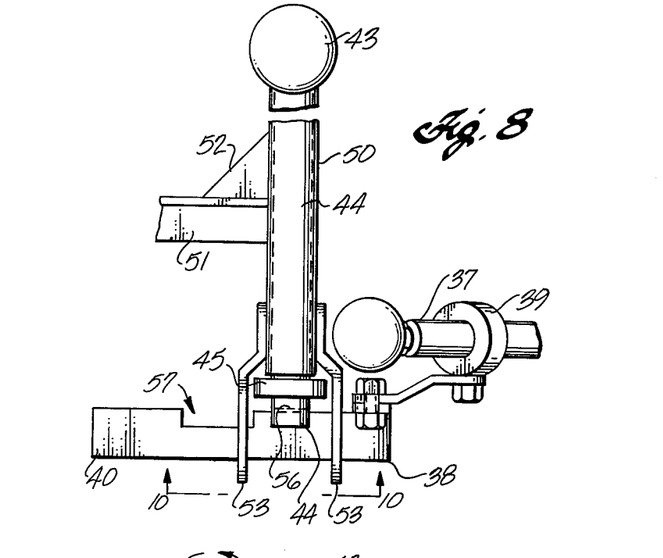
FIG. 8 is a top plan view of a lockout according to this invention taken along line 8—8 in FIG. 5.
Figure 9:
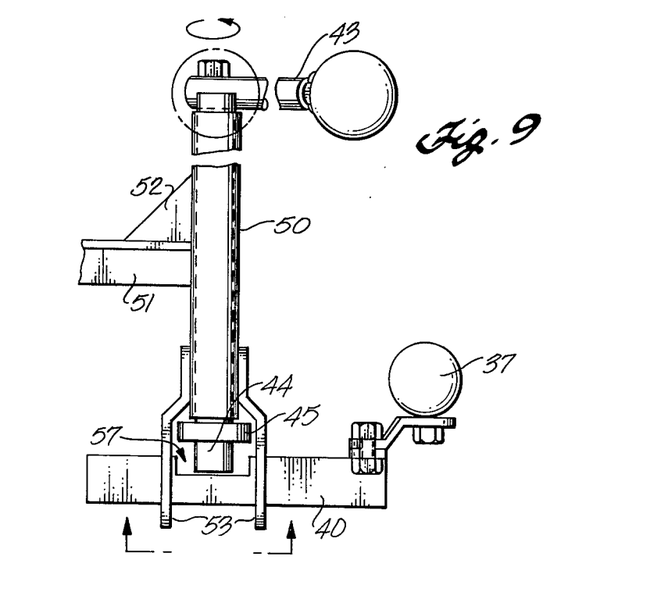
FIG. 9 is a top plan view of the lockout taken along line 9—9 in FIG. 6.

FIG. 8 is a top view of the lockout taken along line 8—8 of FIG. 5 and corresponding to selection of a four-wheel drive mode of operation of the vehicle where transfer case shift lever 37 is tilted from the vertical. As previously discussed, the overdrive shift lever is mounted to cause rotational movement of rod 44. Lockout 38 is connected to tube 50 by a pair of rigid arms 53 mounted to the tube. Arms 53 extend on opposite sides of the rotational axis of rod 44 past its free end and past lockout bar 40. As shown in FIG. 7, each arm 53 defines one of a pair of slots 54 spaced on a line extending past the end of the rod opposite the overdrive shift lever. The slots are adapted to receive lockout bar 40 coupled to the transfer case shift lever 37. The positioning of the slots in the arms is such that the lockout bar is movable relative to the arms in the slots in response to operation of the selector actuator, as shown in FIGS. 8 and 9. Preferably the lockout bar is confined by the slots to move only reciprocally in a horizontal plane perpendicular to the arms.

The lockout bar is adapted to engage the rod 44 when the four wheel drive of the operation has been selected. In FIG. 8, the overdrive shift lever is positioned vertically so that the direct-drive gear ratio has been selected. Engagement of the lockout bar, which preferably is confined by the arms to remain in a horizontal plane, with a slot 56 in the adjacent end of rod 44 prevents rotation of the rod and selection of the overdrive gear ratio.

Figure 10:
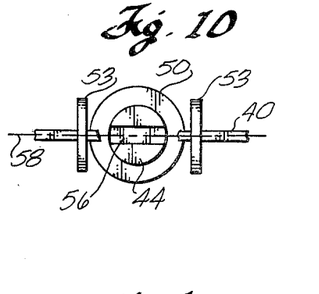
FIG. 10 is an enlarged side elevation view taken along line 10—10 in FIG. 8.

FIG. 10 illustrates the configuration of the rod 44 corresponding to a direct drive mode, which is adapted to engage the lockout bar. In the preferred embodiment, the lockout bar engages the rod by means of slot 56 defined in the end of the rod. When the overdrive shift lever 43 is positioned so that the direct-drive gear ratio has been selected, corresponding to FIG. 8, slot 56 is aligned substantially parallel to the lockout bar so that a side face of the lockout bar may be received in the slot. When the lockout bar engages rod 44, the rod cannot rotate because of interference with the lockout bar. The lockout bar engages the rod when the four wheel drive mode of operation has been selected to prevent rotation of the rod and selection of the other (i.e., overdrive) gear ratio.

FIG. 9 illustrates the configuration of the lockout when a two wheel drive mode of operation has been selected, and the transfer case shift lever 37 has assumed a vertical attitude, causing lockout bar 40 to shift endwise in the slots of arms 53 relative to its position in FIG. 8, toward lever 37. As shown in FIG. 9, a slot 57 is defined in the lockout bar to cause the rod to disengage from the the lockout bar when the two wheel drive mode of operation has been selected. Such disengagement permits rotation of rod 44 and selection of either gear ratio of the overdrive mechanism. The lockout bar is adapted to disengage from the rod 44 when the two-wheel drive mode of operation has been selected to permit rotation of the rod and selection of the other (i.e., overdrive) gear ratio. As long as the lockout bar is disengaged from the rod 44, either gear ratio may be selected. Stated differently, as long as the vehicle is in two wheel drive, either the direct drive or the overdrive gear may be selected.

Figure 11:
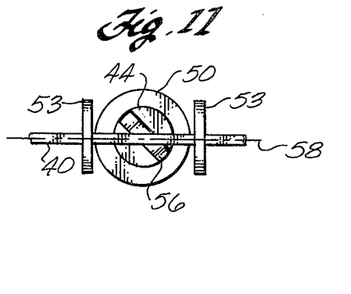
FIG. 11 is an enlarged side elevation view taken along line 11—11 in FIG. 9.

FIG. 11 is an enlarged end elevation of the same rod but corresponding to selection of the overdrive gear ratio. As shown in FIG. 9, selection of the overdrive gear requires rotation of the rod in a clockwise direction. In FIG. 11, the slot 56 for receiving the lockout bar assumes an orientation substantially out of alignment with plane 58 of the lockout bar in the overdrive position. This orientation, which remains out of alignment as long as the overdrive gear ratio has been selected, prevents engagement of the lockout bar in slot 56. The rod is therefore adapted to prevent movement of the lockout bar when the other (i.e., overdrive) gear ratio has been selected to prevent selection of a four wheel drive mode of operation of the vehicle. When the direct-drive gear ratio is selected, slot 56 rotates to align with lockout bar 40, as in FIG. 10, which permits engagement with the lockout bar. The lockout is then free to reciprocate which permits selection of a four wheel drive mode of operation.

The preferred embodiment of the lockout, a described above, interrelates the operation of the separate acuators for the overdrive shifter and for the transfer case selector mechanism to prevent selection of a four wheel drive mode of operation when the overdrive gear ratio has been selected, and vice-versa. However, in vehicles having only two wheel drive capability, in which the other aspects of this invention may be practiced to advantage, there is no need to prevent concurrent engagement of overdrive and four wheel drive, and the lockout need not be included with the overdrive.

Persons skilled in the art to which this invention pertains will appreciate that the preceding description has been presented with reference to the embodiments of the invention illustrated in the accompanying drawings.

It will be understood, however, that the present invention can be manifested in structural and procedural embodiments different from those described. The preceding description sets forth the presently known best mode of practicing the invention, but certainly not all possible modes. Accordingly, workers skilled in the art will readily appreciate that modifications, alterations or variations in the arrangements and procedures described above may be practiced without departing from, and while still relying upon, the essential aspects of this invention.

What is claimed is:

1. Overdrive apparatus connectible in a power train of a motor vehicle between an engine in the vehicle and vehicle driving means such as drive wheels, the apparatus being operable alternately in standard and overdrive modes and comprising:
   an overdrive driving input shaft drivable in response to operation of the engine,
   an overdrive driven output shaft,
   shiftable gear means coupled between the input and output shafts operative for interconnecting the shafts according to one or the other of two different selected gear ratios,
   one of the gear ratios corresponding to standard mode operation of the apparatus and defining an essentially 1:1 velocity ratio between the shafts, and the other gear ratio corresponding to overdrive mode of operation of the apparatus and causing the output shaft to be driven substantially faster than the input shaft, the gear means and the input and output shafts being disposed so that the output shaft is located below the input shaft, and selectively operable overdrive shift means coupled to the gear means operable for shifting the gear means to define one or the other of said gear ratios.

2. Apparatus according to claim 1 wherein the vehicle has four wheels, and the apparatus is arranged for connection of the apparatus input shaft to an output shaft of a selector mechanism operable for selecting between a two wheel drive mode and a four wheel drive mode of operation of the vehicle.

3. Apparatus according to claim 2 wherein the overdrive shift means and the selector mechanism each have a separate actuator, and further comprising lockout means for interrelating the operation of the actuators to prevent selection of the four wheel drive mode of operation when said other gear ratio has been selected, and to prevent selection of said other gear ratio when the four wheel drive mode of operation has been selected.

4. Apparatus according to claim 3 wherein the actuator for the overdrive shift means comprises a movable shift lever mounted at one end of a rod to cause rotational motion of the rod in response to movement of the shift lever for operating the overdrive shift means, the opposite end of the rod being configured to interact with the lockout means.

5. Apparatus according to claim 4 wherein the lockout means comprises:

a pair of rigid arms extending on opposite sides of the rotational axis of said rod, each arm defining one of a pair of slots aligned on a line extending past said opposite end of the rod for receiving a bar coupled to the actuator of the selector mechanism, the bar being movable along the line relative to the arms in the slots in response to operation of said selector actuator, the bar being adapted to engage the rod when the four wheel drive mode of operation has been selected to prevent rotation of the rod and selection of said other gear ratio, the bar being further adapted to disengage from the rod when the two wheel drive mode of operation has been selected to permit rotation of the rod and selection of said other gear ratio, the rod being further adapted to prevent movement of the bar when said other gear ratio has been selected to prevent selection of a four wheel drive mode of operation.

6. Apparatus according to claim 3 wherein the overdrive shift means actuator comprises a movable shift lever, and including linkage means coupled between the shift lever and the overdrive shift means for operating the shift means in response to movement of the shift lever, the lockout means including means cooperable with the linkage means for preventing operation of the linkage means in response to movement of the shift lever.

7. Apparatus according to claim 1 wherein the output shaft is arranged to receive a speedometer worm of the vehicle.

8. Apparatus according to claim 1 which is connectible to a transfer case of the vehicle.

9. Apparatus according to claim 1 wherein the shiftable gear means comprises a synchromesh clutch.

10. A kit for retrofitting a Jeep CJ-5 vehicle for two wheel drive operation in an overdrive gear, the kit comprising:

a gear case connectible to a transfer case of said vehicle;

an overdrive driving input shaft rotatably mounted in the gear case and connectible to an rear axle driving shaft in the transfer case;

a synchromesh clutch located between a direct drive gear and an overdrive gear rotatably received on said overdrive driving input shaft, for selective engagement with either gear to cause rotation of the engaged gear with the input shaft;

an idler shaft rotatably mounted in the gear case and fixedly carrying an idler gear and an overdrive driven gear respectively meshed with the direct drive gear and the overdrive gear;

an overdrive driven output shaft rotatably mounted in the gear case below said idler shaft and fixedly carrying an output gear meshed with the idler gear so that there is an essentially 1:1 velocity ratio between the idler and output shafts, the driven shaft being adapted to receive a speedometer worm of said vehicle and connectible to a rear propeller shaft yoke assembly of said vehicle;

the gear case being adapted to receive a speedometer drive gear, a speedometer sleeve, a speedometer driven gear and a speedometer bushing of the vehicle;

a shift fork engaged with said synchromesh clutch;

an overdrive shift rod mounting said shift fork and received in the gear case for reciprocation between a direct drive position, where the clutch engages the direct drive gear for driving the output shaft via said idler gear with an essentially 1:1 velocity ratio between the input and output shafts, and an overdrive position, where the clutch engages the overdrive gear for driving the output shaft via said overdrive driven gear with a velocity ratio substantially greater than 1:1 between the input and output shafts;

an overdrive actuator arranged to cause said shift rod to reciprocate in response to operation of an overdrive shift lever between a direct drive shift position and an overdrive shift position;

and a lockout arranged to interrelate the operation of the overdrive actuator with the operation of a vehicle selector mechanism for selecting between two and four wheel drive modes of operation of the vehicle to prevent concurrent engagement of the overdrive gear and a four wheel drive mode of the vehicle.

11. In a motor vehicle in which engine torque is transmitted from a drive shaft driven by an engine in the vehicle to a drive axle through a pair of single cardan universal joints operating at an angle to said drive shaft and drive axle, the cardan joints being associated respectively with the drive shaft and the drive axle, the improvement comprising an overdrive mechanism connectible to the drive shaft and comprising shiftable means coupled to the drive shaft for selectively transmitting engine torque, in either of two alternate effective gear ratios, from the drive shaft to its associated cardan joint, the shiftable means being arranged to cause said associated cardan joint to be so located vertically relative to the other cardan joint to produce a reduction in said angle.

12. In a motor vehicle in which a propeller shaft is mounted for rotation between a first single cardan joint, coupled to a substantially horizontal drive shaft driven by an engine in the vehicle, and a second single cardan joint coupled to a substantially horizontal input shaft of a vehicle drive axle, the propeller shaft transmitting torque from the engine to the drive axle, and in which the propeller shaft is inclined relative to a substantially horizontal reference plane associated with a chassis of the vehicle, the improvement comprising an overdrive mechanism connectible to the drive shaft for selectively transmitting engine torque, in either of two alternate effective gear ratios, from the drive shaft to the first cardan joint, the overdrive mechanism being arranged to cause the first cardan joint, upon connection of the overdrive mechanism to the drive shaft, to be so located vertically relative to the second cardan joint to cause no increase in the inclination of the propeller shaft relative to said reference plane.

13. A motor vehicle according to claim 12 wherein the length of the propeller shaft when the overdrive is connected is reduced relative to a propeller shaft length pertinent to said motor vehicle operable without the overdrive mechanism.

14. In a motor vehicle adapted for operation in either a two wheel drive configuration or a four wheel drive configuration, the vehicle being further adapted for operation in an overdrive gear while engaged in the two wheel drive configuration, the improvement comprising a reciprocal lockout means for preventing operation of the vehicle in the overdrive gear when the vehicle is engaged in the four wheel drive configuration, and for preventing engagement of the four wheel drive configuration when the vehicle is operated in the overdrive gear.

* * * * *